United States Patent [19]

Gnatowski et al.

[11] Patent Number: 5,763,518

[45] Date of Patent: Jun. 9, 1998

[54] THERMOPLASTIC PHOTODEGRADABLE AND BIODEGRADABLE POLYMER BLEND

[75] Inventors: Marek Gnatowski, Coquitlam; Andy Koutsandreas, Vancouver; Terry Foster, Victoria; David Fookes, New Westminster, all of Canada

[73] Assignee: Minister of National Defence National Defence Headquarters, Ottawa, Canada

[21] Appl. No.: 663,277

[22] PCT Filed: Dec. 10, 1993

[86] PCT No.: PCT/CA93/00530

§ 371 Date: Aug. 16, 1996

§ 102(e) Date: Aug. 16, 1996

[87] PCT Pub. No.: WO95/15999

PCT Pub. Date: Jun. 15, 1995

[51] Int. Cl.[6] ............................................. C08K 5/09
[52] U.S. Cl. ............................ 524/322; 525/412; 525/415
[58] Field of Search ........................ 524/322; 525/412, 525/415

[56] References Cited

U.S. PATENT DOCUMENTS

| | | | |
|---|---|---|---|
| 3,931,090 | 1/1976 | Amatangelo | 524/322 |
| 4,032,479 | 6/1977 | Bunnomori et al. | 525/412 |
| 5,352,498 | 10/1994 | Kansupada | 525/412 |
| 5,610,214 | 3/1997 | Olson | 524/322 |

FOREIGN PATENT DOCUMENTS 0444003  8/1991  European Pat. Off. ............ 524/322

*Primary Examiner*—Joseph L. Schofer
*Assistant Examiner*—N. Sarofim
*Attorney, Agent, or Firm*—George A. Seaby

[57] ABSTRACT

A photodegradable and fully biodegradable plastic material, which can be molded using conventional molding techniques and which has good physical and mechanical properties includes a blend of polyisoprene and polycaprolactone resins. The material biodegrades in soil and sea water environments. All blend ingredients are completely decomposed by microorganisms. Polyisoprene is a natural polymer present in a large variety of plant species or is man made. Polycaprolactone is a synthetic polymer resin known to be decomposed by microorganisms. The plastic material has thermoplastic properties which permits processing of the material using conventional plastic working techniques. The presence of $C_1$–$C_{15}$ saturated fatty acids and organic peroxide compatibilizers improve the properties of the blend, especially when large quantities of polyisoprenes are used which allows the production of high quality blown films.

20 Claims, 3 Drawing Sheets

THERMOPLASTIC PHOTODEGRADABLE AND BIODEGRADABLE POLYMER BLEND

This invention relates to fully biodegradable and photodegradable polymer blends and to methods of making the same.

More specifically, the present invention relates to blends of polyisoprene and polycaprolactone which have thermoplastic properties, and which are biodegradable in soil and sea water environments, and photodegradable.

As a result of concerns about the environment and disposal of waste materials, a great deal of effort has been directed towards the development of biodegradable plastic materials. The main emphasis of such effort has been placed on the mechanisms of photodegradation and biodegradation. Photodegradation is the decomposition of photosensitive materials initiated by the ultraviolet component of natural light, and biodegradation results from the action of microorganisms such as bacteria, fungi or algae.

Photodegradablity is an inherent property of some polymers and in certain cases it can be enhanced by the use of photosensitizing additives. Photodegradable plastics have found use in applications such as agricultural mulch film, trash bags, and retail shopping bags.

Several different types of plastics have been produced which are fully or partially biodegradable. Some effort has been made to modify non-biodegradable polymers with starch in concentrations of 2–15%. However some controversy remains as to whether such materials are completely biodegradable. Some newer materials which use starch as part of the polymer matrix at levels of 60–100% are reported to be completely biodegradable. Certain polyester polymers have been shown to be biodegradable. These include aliphatic esters such as polyhydroxybutyrate-valerate (PHBV) and polycaprolactone.

Polycaprolactone blends are known which contain a variety of thermoplastic resins including polyethylene, polystyrene and nylon and are degradable in soil or sea water. However, because of the presence of non-biodegradable resin components, such blends are not completely biodegradable. In addition, the blends do not possess accelerated photodegradation abilities as measured against the properties of widely used commercial plastics.

The polyisoprene-polycaprolactone blend disclosed by Canadian Patent No. 1,111,179 which issued to Eric G. Kent on Oct. 20, 1981 is described as having thermoplastic properties. The patented invention is used for molding components of orthopedic devices specifically because of the mechanical and thermal properties of the material. Canadian Patent No. 1,080,875, which issued to Eric G. Kent on Jul. 1, 1980 also describes a blend containing polyisoprene and polycaprolactone. Because of its mechanical properties, the blend is used in the manufacture of sporting goods, specifically golf ball covers. Japanese Patent No. JP 89293048 describes a multi-component biodegradable coating consisting of polycaprolactone, olefinic polymers, wax, petroleum resin and fats and their derivatives including metal salts. The possibility of introducing a natural resin (polyisoprene) into such a coating is mentioned. Moreover, one of the resins mentioned is natural rubber. Fertilizer grains are coated by such a coating, which is degraded by microorganisms in the soil.

None of the above mentioned patents suggests using a composition for manufacturing a product using known plastic working methods such as injection molding, extrusion, blow molding or similar techniques which have significant importance in applications for biodegradable and photodegradable plastics. Moreover, none of the patents suggests a composition which is photodegradable or biodegradable in sea water. Only the Japanese patent mentions a composition with the ability to biodegrade in soil.

Known biodegradable polymers have suffered slow acceptance due to limitations in processing and high costs relative to conventional, non-degradable polymers.

An object of the present invention is to provide a plastic material which can be made economically is completely biodegradable and photodegradable, and which has thermoplastic properties comprising a blend of polyisoprene and polycaprolactone.

Another object of the invention is to provide a biodegradable and photodegradable plastic material comprising a blend of polyisoprene and polycaprolactone which can be used to manufacture articles using conventional plastic processing techniques. More specifically, the invention is intended to provide a plastic composition comprising a blend of polyisoprene, polycaprolactone and compatibilizers which can be used to produce good quality blown films.

Another object of the invention is to provide a biodegradable and photodegradable article formed from a blend of polyisoprene and polycaprolactone which has improved mechanical properties and performance at high temperatures because of a post-forming radiation treatment.

Yet another object of the invention is to provide a method of making a fully biodegradable and photodegradable plastic article by mixing polyisoprene and polycaprolactone to form a blend, and processing the thus produced blend using conventional plastic working techniques to form the article.

The invention provides a polyisoprene/polycaprolactone polymer blend having thermoplastic properties which is fully biodegradable in soil and sea water and is photodegradable.

The polyisoprene/polycaprolactone blend of the invention includes 10 to 500 parts by weight (pbw) of polycaprolactone per 100 pbw polyisoprene resin, preferably 25 to 200 pbw of polycaprolactone per 100 pbw polyisoprene. Some additives such as, inter alia, casein, antioxidants, dyes, fillers, vulcanized vegetable oils, fatty acids, peroxides, coupling agents, fragrances, blowing agents, antistatic agents, fire retardants and pigments commonly used in the plastic and rubber industry may be incorporated into the blends in small amounts.

Polyisoprene can be obtained form natural rubber, or can be produced as a synthetic polymer. Natural rubber contains polyisoprene and is produced by many different plant species. In its natural state, the rubber is biodegradable; however, the use of stabilization techniques results in reduced biodegradability. Natural rubber, in its pure form, is not acceptable without vulcanization for producing useful products using conventional techniques such as injection and blow molding, and extrusion which are used for thermoplastic polymeric materials. The main reasons for this are the poor flow characteristics of natural rubber (unless suitably prepared), unsuitable mechanical properties, and tackiness prior to vulcanization.

Polycaprolactone is a synthetic polymer resin known to be decomposed by microorganisms. However the applications for polycaprolactone in commercial manufacturing are limited because of its relatively high price.

The properties of the polyisoprene/polycaprolactone blends of this invention are very different from the properties described above for the individual polymers. The blends have thermoplastic properties which allow processing using conventional plastic working techniques such as injection molding, blow molding and extrusion. The blend has no tackiness and does not stick to cold metal elements of the equipment. The flow properties above the softening point of the blend permit processing using known plastic working techniques. A blend in accordance with the invention containing even low levels of polycaprolactone (20%) is capable of being permanently oriented when force is applied, and will significantly increase the tensile modulus and reduce or eliminate the elastic property characteristic of some grades of polyisoprene to levels typical of some commonly used plastics.

The polyisoprene/polycaprolactone blends can be produced using techniques known to be suitable for blending rubber or plastic such as extrusion, two roll milling and Banbury milling. The blending temperature should be above 60~C. and preferably in the range 65°–170° C. In some cases, when the blend contains larger amounts of polyisoprene (especially synthetic polyisoprene), the addition of coupling agents is recommended.

It was found that saturated fatty acids in combination with peroxides create good coupling systems for polyisoprene/polycaprolactone blends. Moreover, both polymers should be completely blended and dispersed before peroxides are added. The thermoplastic resin obtained from the mixing of the two polymers should be ground or pelletized for future use if the resin is intended for injection molding, blow molding or extrusion manufacturing processes. When compression or transfer molding processes are to be used for manufacturing goods, the resin can be stored in the form of sheets.

Such polyisoprene/polycaprolactone blends have a relatively stable chemical structure when exposed to heat during processing. They can be processed with standard equipment used for injection molding, blow molding, thermoforming, extrusion, compression or transfer molding to manufacture bottles, containers, films, etc.

The mechanical properties of manufactured goods produced using the polyisoprene/polycaprolactone blend can be improved by exposing them to electron beam or gamma radiation. Under irradiation, the polyisoprene present in the blend becomes cross-linked, and mechanical properties such as tensile strength, elongation at break and impact strength are significantly improved, especially for blends with larger amounts of polyisoprene.

Articles made from polyisoprene/polycaprolactone blends which are placed in soil or sea water will biodegrade at variable rates. The biodegradation rate depends on conditions such as moisture level (soil), air (oxygen) concentration, temperature, presence of microorganisms, etc. It is expected that there should be no products of degradation other than carbon dioxide and water. An article made from the blends will degrade quickly when exposed to sunlight. The presence of ultraviolet radiation in the sunlight, light intensity and temperature will individually influence the degradation rate.

The following examples describe preferred embodiments of the invention.

EXAMPLE 1

13.6 kg of polyisoprene in the form of natural rubber grade SMR-L was premasticated using a two roll mill at a temperature of 50°–75° C. After fifteen minutes of mastication, when the temperature rose to 75° C., 6.8 kg of polycaprolactone, in the form of Tone* P-787 Polymer (Union Carbide) was added slowly over an 8 minute period. The blend was mixed at 75° C. for the next 5 minutes, as per standard milling procedure, and was then cooled and ground to achieve a particle size of 6–30 mesh blend. The resulting blend is described in the following examples as Blend A.

EXAMPLE 2

13.6 kg of polyisoprene in the form of natural rubber grade SMR-L was mixed with 13.6 kg of polycaprolactone in the form of Tone P787 (Union Carbide). Mixing and grinding were done as described in Example 1 with the exception that the time for addition of the polycaprolactone to the polyisoprene was extended to 12 minutes. The resulting blend is described in the following examples as Blend B.

EXAMPLE 3

9.1 kg of polyisoprene in the form of natural rubber grade SMR-L was mixed with 18.2 kg of polycaprolactone in the form of Tone P-787 Polymer and 283 g of Orange* PV-RL 01 (Hoechst). Mixing and grinding were done according to the method of Example 1 with the exception that the time for addition of the polycaprolactone to the polyisoprene was extended to 18 minutes. The blend is described in the following examples as blend C.

EXAMPLE 4

13.6 of polyisoprene in the form of natural rubber grade SMR-L was premasticated using a two roll mill at a temperature of 50°–95° C. for 15 minutes. After mastication, when the temperature had risen to 95° C., 2.3 kg of edible technical grade casein (90 Mesh) was added and mixed for another 15 minutes 95° C. At this time, the temperature of the blend was reduced to 75° C. and 6.8 kg of polycaprolactone in the form of Tone P-787 Polymer was added slowly over an 8 minute period. The blend was mixed at 75° C. for the next 5 minutes, as per standard milling procedure, and was then cooled and ground to achieve a particle size of 6–30 mesh blend. The resulting blend is described in the following examples as Blend D.

EXAMPLE 5

An injection molding machine, with a reciprocating screw, was fed with polyisoprene/polycaprolactone Blend A. The temperature of the heating zones were as follows: Zone 1— 180° C., Zone 2—190° C., Zone 3—200° C. The nozzle heater was at 70% capacity. A mold designed to produce test specimens with variable thicknesses, including tensile bars according to ASTM D-638M, was used. The mold was cooled with tap water at 15° C. Total shot size was 23.5 g. The machine was operated using standard procedures for molding plastics. The moldings obtained showed adequate replication of cavities and good surface finish.

EXAMPLE 6

A Keotex KEB-1 extruder, with a 50 mm extruding screw, was used for molding 100 ml bottles using polyisoprene/polycaprolactone Blend C. The temperature of the heating zones were as follows: Zone 1—150° C., Zone 2—170° C., Zone 3— 170° C. The extrusion head temperature was 190° C. The 100 ml bottle mold was cooled with tap water at 15° C. The bottles thus obtained had adequate finish and surface quality.

EXAMPLE 7

A hot press with cooling system was equipped with a mold heated to 120° C. 6.5 g of polyisoprene/polycaprolactone Blend B or D was placed in the mold cavity measuring 0.3 mm×140 mm×140 mm. The mold was closed under 300 psi pressure, heat was shut down and the cooling system was actuated. A molding was obtained in the sheet form with no defects and a good surface finish.

EXAMPLE 8

Injection molded specimens in the form of tensile bars (produced according to ASTM D-638M) were obtained using polyisoprene/polycaprolactone Blend A. Specimens were exposed to electron beam (EB) radiation with 120 KGray. Specimens were later tested according to ASTM D-638M for tensile strength and elongation at break at a temperature of 23±2° C., together with control specimens not exposed to radiation. The results of testing, which indicate improvement in the mechanical properties of polyisoprene/polycaprolactone Blend A after exposure to EB radiation, are shown in Table 1.

TABLE 1

TENSILE PROPERTIES OF SPECIMENS

| Specimen No. | Dose (kGy) | Temperature (°C.) | Tensile Strength (MPa) | Elongation At Break (%) |
|---|---|---|---|---|
| 1 | 120 | 23 | 12.2 | 1355.0 |
| 2 | 0 | 23 | 3.2 | 232.9 |

EXAMPLE 9

Blow molded bottles made from polyisoprene/polycaprolactone Blend C, produced as described in Example 6, and bottles produced from high density polyethylene (HDPE) were placed in exterior conditions in garden soil, approximately 5 cm deep, from late March to late May in Vancouver, B.C. The bottles were inspected at the end of the experiment and tested for weight loss, as well as for surface damage visible with the naked eye and under a microscope. The results listed in Table 2 indicate biodegradation of bottles made from polyisoprene/polycaprolactone Blend C. The bottles made from polyethylene were unchanged.

TABLE 2

DEGRADATION IN GARDEN SOIL OF BOTTLES MADE FROM BLEND C IN COMPARISON WITH POLYETHYLENE BOTTLES

| Bottle Materials | Exposure Period (days) | Weight Initial (g) | Weight After Exposure (g) | Weight Loss (g) | Appearance |
|---|---|---|---|---|---|
| Blend C | 70 | 13.661 | 12.787 | 0.874 | Extensive surface deterioration and colonization |
| Polyethylene | 70 | 13.312 | 13.294 | 0.018 | No change |

EXAMPLE 10

Plastic sheets compression molded from polyisoprene/polycaprolactone Blend B or D in a similar manner to that described in Example 7, and identical sheets made from HDPE were immersed in sea water for a period of 30 or 90 days (at water temperature of 10±2° C.) from the beginning of February to the end of May. The specimen exposure area was screened from direct sunlight. The sheets were inspected at the end of the period and tested for weight loss, change in dimensions, surface damage, and growth of microorganisms visible with the naked eye and under a microscope. The results listed in Table 3 indicate biodegradation of the sheets made from the polyisoprene/polycaprolactone blends.

TABLE 3

DEGRADATION IN SEA WATER OF SHEETS MADE FROM BLEND B AND D IN COMPARISON WITH HDPE SHEETS

| Sheet Materials | Exposure Period (days) | Weight Loss per 100 cm$^2$ Sample (g)* | Appearance |
|---|---|---|---|
| Blend B | 30 | 0.07 | Deposit of microorganisms beginning |
|  | 100 | 0.26 | surface deterioration |
| Blend D | 30 | 0.08 | Deposit of microorganisms beginning |
|  | 100 | 0.38 | surface deterioration |
| HDPE | 30 | 0 | No visible change |
|  | 100 | 0 |  |

*Based on one side of specimen.

EXAMPLE 11

Hot-pressed film specimens approximately 0.25 mm (10 mil) made from polyisoprene/polycaprolactone Blend C were placed in a Quv accelerated weathering machine along with linear low density polyethylene (LLDPE—Dupont Sclair 2114) film specimens prepared in similar manner and were exposed according to ASTM D4329. UVB-313 lamps were employed to irradiate the specimens with ultraviolet rays. The test condition consisted of alternating cycles of 8 hours of UV light followed by 4 hours of condensation. The temperature for the light cycle was 40° C. and 50° C. for the condensation cycle. Sample specimens were tested for tensile strength (TS) and elongation at break (EB) according to ASTM D882 after 200 hours and 400 hours accelerated aging. The results are shown in Table 4 and Table 5. The polyisoprene/polycaprolactone Blend C showed greater loss of tensile strength and elongation at break in comparison with polyethylene.

TABLE 4

TENSILE STRENGTH (TS) OF BLEND C IN COMPARISON WITH LLDPE AFTER EXPOSURE TO ACCELERATED WEATHERING

| | Exposure 200 Hours | | | Exposure 400 Hours | | |
|---|---|---|---|---|---|---|
| Polymer | TS Initial MPa | TS Final MPa | Changes (%) | TS Initial MPa | TS Final Mpa | Changes (%) |
| Blend C | 19.2 | 13.4 | −30 | 19.2 | 7.8 | −59 |
| Polyethylene | 12.5 | 14.9 | +19 | 12.5 | 9.9 | −21 |

TABLE 5

ELONGATION AT BREAK (EB) OF BLEND C IN COMPARISON WITH POLYETHYLENE AFTER EXPOSURE TO ACCELERATED WEATHERING

| | Exposure 200 Hours | | | Exposure 400 Hours | | |
|---|---|---|---|---|---|---|
| Polymer | EB Initial (%) | EB Final (%) | Changes (%) | EB Initial (%) | EB Final (%) | Changes (%) |
| Blend C | 1120 | 666 | −41 | 1120 | 18 | −98 |
| Polyethylene | 36 | 17 | −53 | 36 | 7 | −81 |

It has also been found that the mixing of fatty acid and organic peroxide compatibilizers with polyisoprene/polycaprolactone blends improves the production of high quality blown films. This aspect of the invention will be described with reference to the following examples and the accompanying drawings, wherein.

EXAMPLE 12

5 kg of synthetic polyisoprene (Natsyn 2210*—Goodyear) was blended with 5 kg of polycaprolactone (Tone 787*—Union Carbide) using a Brabender extruder with a ¾" screw (L:D=25). Blending was carried out at 150° C. and the screw speed was established at 28 rpm. The blend was extruded through a ⅛" diameter die, cooled in a water bath and pelletized using a 2" Killion pelletizer. The prebletized pellets were then mixed with various amount of additive, namely $C_{16}$–$C_{18}$ saturated fatty acids (Emersol 132*—Henkel) and an organic peroxide (Trigonox 29/40*—Akzo), and blended again in the extruder at 140° C. with a screw speed established at 15 rpm. Emersol 132 is a mixture of palmitic and stearic acids. The active ingredient in Trigonox 29/40 is 1,1-di-(t-butylperoxy)-3,3,5-trimethylcyclohexane. The blend was then extruded again through the ⅛" diameter die, cooled in water and pelletized. As set out in Table 6, a total of nine blends or specimens containing variable quantities of additives were made as well as one control with no additives.

*- trademark

TABLE 6

| Specimen No. | Peroxide (Trigonox 29/40) phr* | Stearic/Palmitic Acid phr* |
|---|---|---|
| 3 | 0.00 | 0.00 |
| 4 | 0.00 | 2.00 |
| 5 | 0.03 | 2.00 |
| 6 | 0.06 | 2.00 |

TABLE 6-continued

| Specimen No. | Peroxide (Trigonox 29/40) phr* | Stearic/Palmitic Acid phr* |
|---|---|---|
| 7 | 0.12 | 2.00 |
| 8 | 0.20 | 2.00 |
| 9 | 0.06 | 0.00 |
| 10 | 0.06 | 3.00 |
| 11 | 0.06 | 4.00 |
| 12 | 0.06 | 6.00 |

*Parts of additive per hundred parts of resin.

A Brabender extruder with a ¾" screw (L:D=25) and ancillary equipment (die, air cooling ring, compressed air supply and take off) for making blown films was charged with granulated polyisoprene/polycaprolactone specimens 3 through 12 of Table 6.

The temperature of the heating zones were as follows: Zone 1—95° C., Zone 2—100° C., Zone 3—100° C., Zone 4—95° C. and Die—103° C. Screw speed was established at 16 rpm and the take off equipment speed indicator was at 16. The film blowing pressure was 0.75–10 kPa, and the air pressure supplied to the cooling ring was 35–200 kPa.

The blown film sleeve made under the above described conditions was approximately 0.17 mm thick and 100 mm wide. The mechanical properties of elongation at break and tensile strength of the film were tested for the machine direction according to ASTM D-882. The results obtained from testing are set in Table 7.

TABLE 7

| Specimen No. | Tensile Strength (MD) MPa | Elongation at Break % |
|---|---|---|
| 3 | 6.44 | 440 |
| 4 | 13.1 | 890 |
| 5 | 14.4 | 860 |
| 6 | 14.4 | 830 |
| 7 | 13.5 | 740 |
| 8 | 15.3 | 700 |
| 9 | 11.2 | 550 |
| 10 | 14.8 | 875 |
| 11 | 16.5 | 880 |
| 12 | 14.7 | 865 |

The results of the tests are set out in graph form in FIGS. 1 to 4. The addition of small quantities of fatty acid increases the elongation at break. Small quantities of both additives increase the tensile strength of the film.

The following Example 13 describes the preparation of polyisoprene/polycaprolactone blown films containing relative high proportions of polyisoprene.

EXAMPLE 13

5 kg of synthetic polyisoprene (Natsyn-2210—Goodyear) was blended with 5 kg of polycaprolactone (Tone 787—Union Carbide) and 400 g stearic/palmitic acid (Emersol 132—Henkel) using a Brabender extruder with ¾" screw (L:D=25). The blending was carried out at 155° C. and the screw speed was established at 28 rpm. The blend was extruded through a ⅛" diameter die, cooled in a water bath and pelletized using a 2" Killion pelletizer. The pellets were then mixed with 8 g* of organic peroxide (Trigonox 29/40-Akzo), and blended again in the extruder at 140° C. with screw speed established at 15 rpm, followed by extrusion through a ⅛" die and pelletization.

*Based on total peroxide content of Trigonox 29/40

The pellets were again mixed with synthetic polyisoprene (Natsyn 2210) in quantities:

Blend 13—3122 g pellets and 1500 g synthetic polyisoprene, and 40 g stearic/palmitic acid.

Blend 14—3122 g pellets and 3000 g synthetic polyisoprene, and 240 g stearic/palmitic acid.

Blend 15—3122 pellets, 4500 g synthetic polyisoprene, and 330 g stearic/palmitic acid.

The materials were extruded again at 155° C. with the screw speed at 28 rpm and then pelletized. Finally, the thus obtained pellets of Blends 13, 14 and 15 were mixed with additional amounts of organic peroxide (Trigonox 29/40 Akzo) in the quantities:

Blend 13—4000 g pellets and 1.05 g* organic peroxide (Trigonox 29/40).

*Based on total peroxide content of Trigonox 29/40

Blend 14—5000 g pellets and 1.96 g* organic peroxide (Trigonox 29/40).

*Based on total peroxide content of Trigonox 29/40

Blend 15—6000 g pellets and 2.84 g* organic peroxide (Trigonox 29/40).

*Based on total peroxide content of Trigonox 29/40

Polyisoprene/polycaprolactone blends with peroxide were blended and extruded at 140° C. and at a screw speed 15 rpm, cooled in a water bath and pelletized again for further processing into blown films.

Figure 1:
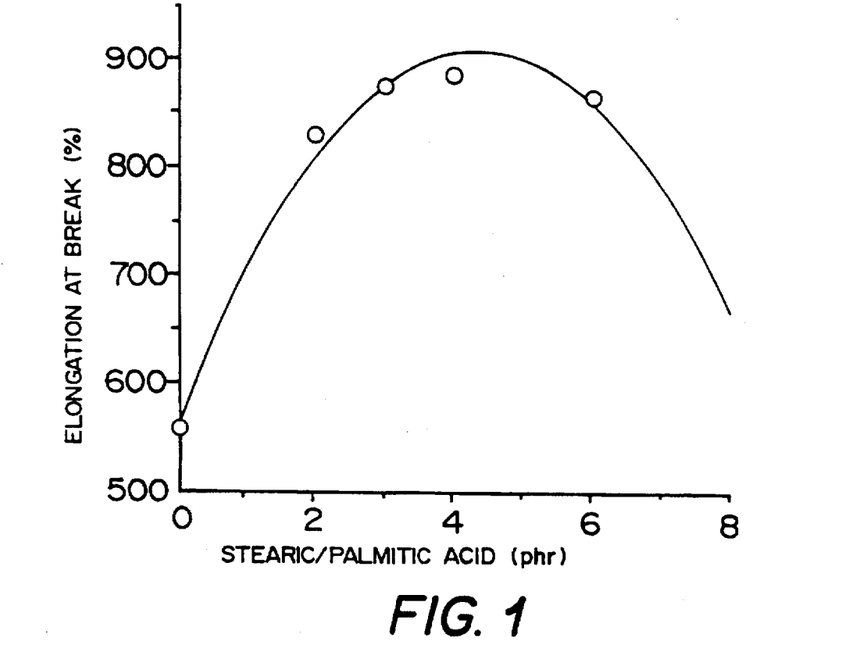
FIG. 1 is a graph of elongation at break versus stearic/palmitic acid content of blown polyisoprene/polycaprolactone films.
Figure 2:
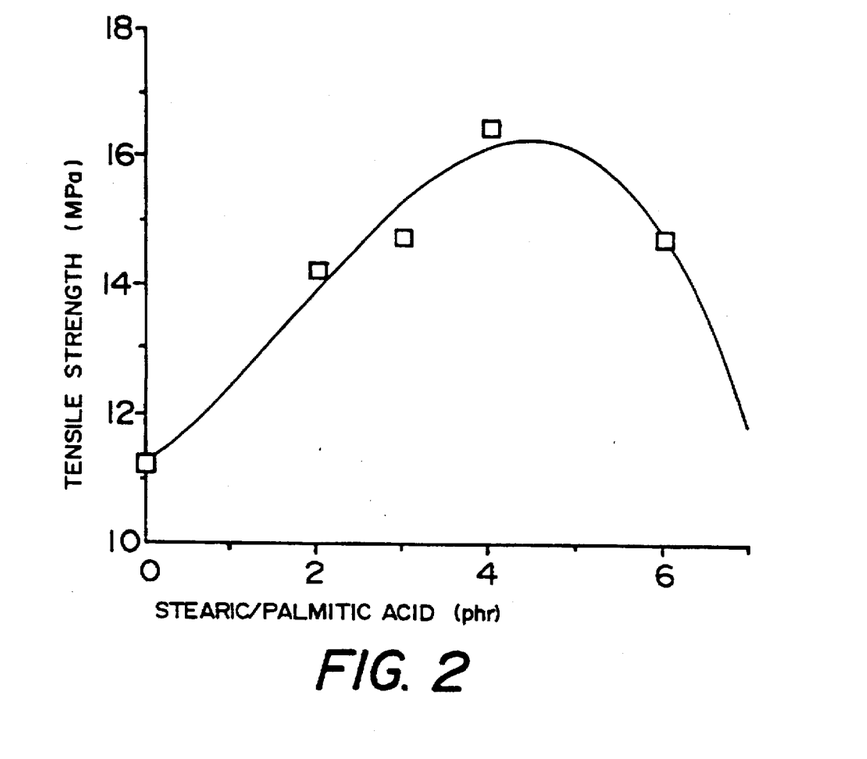
FIG. 2 is a graph of tensile strength versus stearic/palmitic acid content of polyisoprene/polycaprolactone films.
Figure 3:
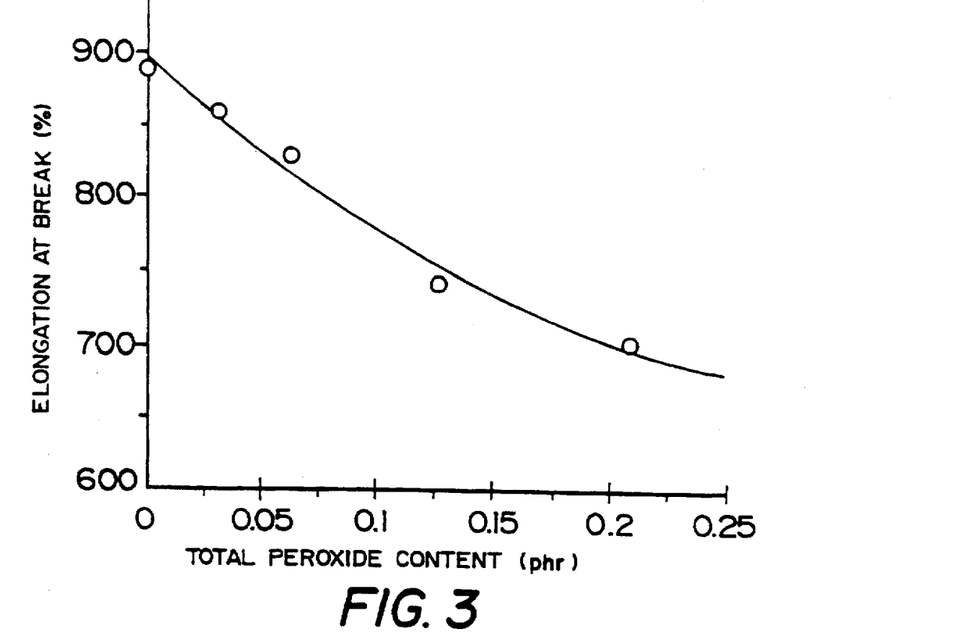
FIG. 3 is a graph of elongation at break versus organic peroxide content of polyisoprene/polycaprolactone films.
Figure 4:
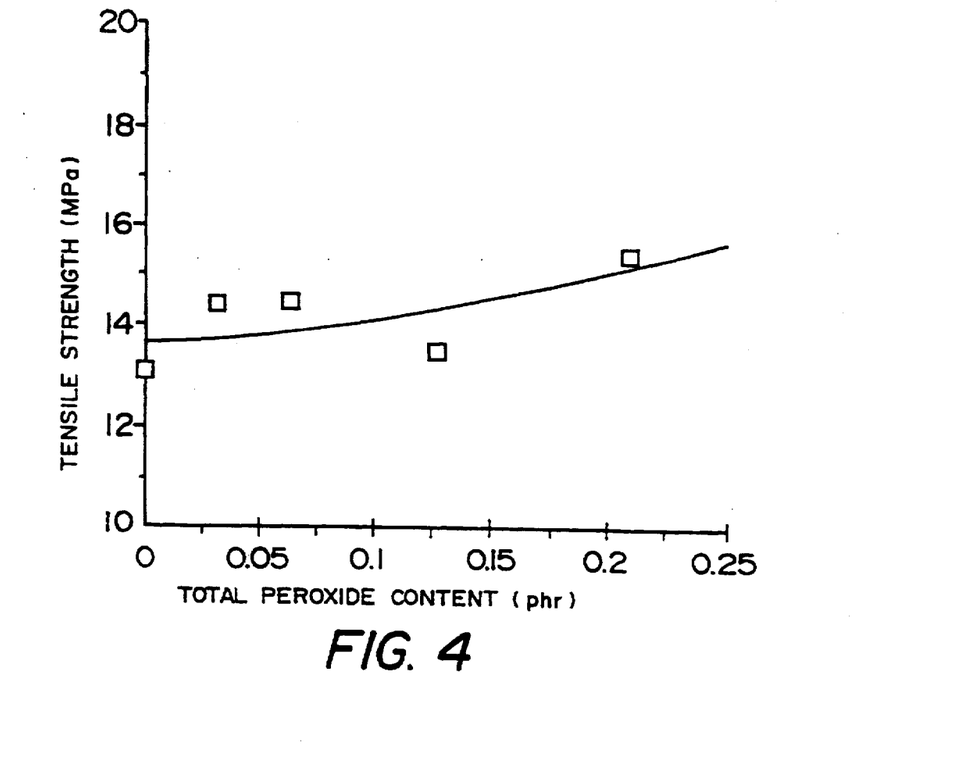
FIG. 4 is a graph of tensile strength versus organic peroxide content of polyisoprene/polycaprolactone films containing stearic/palmitic acid.
Figure 5:
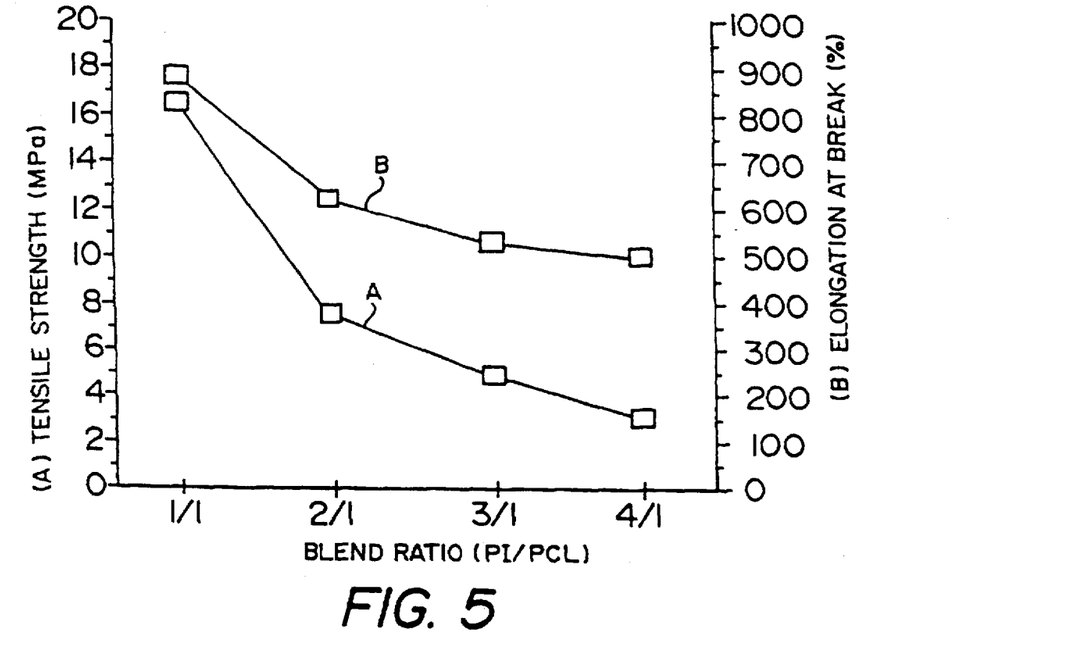
FIGS. 5 and 6 are graphs of tensile strength and elongation at break for a variety of mixtures of polyisoprene (PI), polycaprolactone (PCL) and stearic/palmitic acids.

The equipment and procedure to make a blown film using the various blends is described in Example 12. The tensile strength and elongation at break test results for films made from blends 13 to 15 are set out in Table 8 and illustrated graphically in FIG. 5.

TABLE 8

| Specimens or Blend No. | PI/PCL | Tensile Strength MD MPa | Elongation at Break MD % |
|---|---|---|---|
| 13 | 2/1 | 7.53 | 620 |
| 14 | 3/1 | 4.95 | 530 |
| 15 | 4/1 | 3.12 | 500 |

*Based on total peroxide content of Trigonox 29/40

Example 14 describes the mechanical properties of blown films produced from polyisoprene/polycaprolactone mixtures using multiple stages of blending.

EXAMPLE 14

In a first stage (Stage 1) of blend preparation, $A_1$ kg (see Table 9 for specific data) of synthetic polyisoprene (Natsyn 2210—Goodyear) was blended with B kg of polycaprolactone ($B_1$=Tone 787 and $B_2$=Tone 767E—Union Carbide) and $C_1$ kg of stearic/palmitic acids (Emersol 132—Henkel) using a Brabender extruder with ¾" screw (L:D=25). The blending was done at a temperature $T_1$ and the screw speed was established at 28 rpm. The blend was extruded through a ⅛" diameter die, cooled in a water bath, and pelletized using a 2" Killion pelletizer.

In a second stage (Stage 2), the pellets were mixed with $D_1$ kg* of organic peroxide (Trigonox 29/40—Akzo) and again blended in the extruder at $T_2$=140° C. with the screw speed established at 15 rpm, followed by extrusion through a ⅛" die, cooling and pelletizing.

*Based on total peroxide content of Trigonox 29/40

In a third stage (Stage 3), pellets were again mixed with synthetic polyisoprene (Natsyn 2210) in quantities of $A_2$ and stearic/palmitic acids (Emersol 132—Henkel) in quantities $C_2$. The mixture was again extruded at $T_3$=150° C., cooled and pelletized.

Finally, in a fourth stage (Stage 4), the pellets obtained were mixed with an additional amount $D_2$ kg* of organic peroxide (Trigonox 29/4-Akzo), extruded at a temperature $T_4$=140° C. with a screw speed at 15 rpm, cooled and pelletized.

*Based on total peroxide content of Trigonox 29/40

Five different blends 16 to 20 of polyisoprene/polycaprolactone were obtained. Conditions of blend preparation are listed in Table 9. The blends were processed into blown films.

TABLE 9

| | Stage 1 | | | Stage 2 | | | Stage 3 | | | Stage 4 | | |
|---|---|---|---|---|---|---|---|---|---|---|---|---|
| Blend | Materials Added kg | Screw Speed rpm | Barrel Temp. $T_1$ °C. | Materials Added kg | Screw Speed rpm | Barrel Temp. $T_2$ °C. | Materials Added kg | Screw Speed rpm | Barrel Temp. $T_3$ °C. | Materials Added kg | Screw Speed rpm | Barrel Temp. $T_4$ °C. |
| 16 | $A_1$ = 1.00<br>$B_1$ = 1.00<br>$C_1$ = 0.08 | 28 | 155 | $D_1$ = 0.0016 | 15 | 140 | $A_1$ = 1.00<br>$C_2$ = 0.06 | 28 | 150 | $D_2$ = 0.0008 | 15 | 140 |
| 17 | $A_1$ = 2.00<br>$B_1$ = 1.00<br>$C_1$ = 0.12 | 28 | 155 | $D_1$ = 0.0024 | 15 | 140 | | | | | | |
| 18 | $A_1$ = 2.00<br>$B_1$ = 1.00<br>$C_1$ = 0.12 | 28 | 170 | $D_1$ = 0.0024 | 15 | 140 | | | | | | |
| 19 | $A_1$ = 0.5<br>$B_1$ = 1.00<br>$C_1$ = 0.06 | 28 | 155 | $D_1$ = 0.0012 | 15 | 150 | $A_2$ = 1.500<br>$C_2$ = 0.06 | 28 | 150 | $D_2$ = 0.012 | 15 | 140 |
| 20 | $A_1$ = 1.00<br>$B_1$ = 0.50<br>$B_2$ = 0.50<br>$C_1$ = 0.08 | 28 | 155 | $D_1$ = 0.0016 | 15 | 150 | $A_2$ = 1.00<br>$C_2$ = 0.04 | 28 | 150 | $D_2$ = 0.0008 | 15 | 140 |

Figure 6:
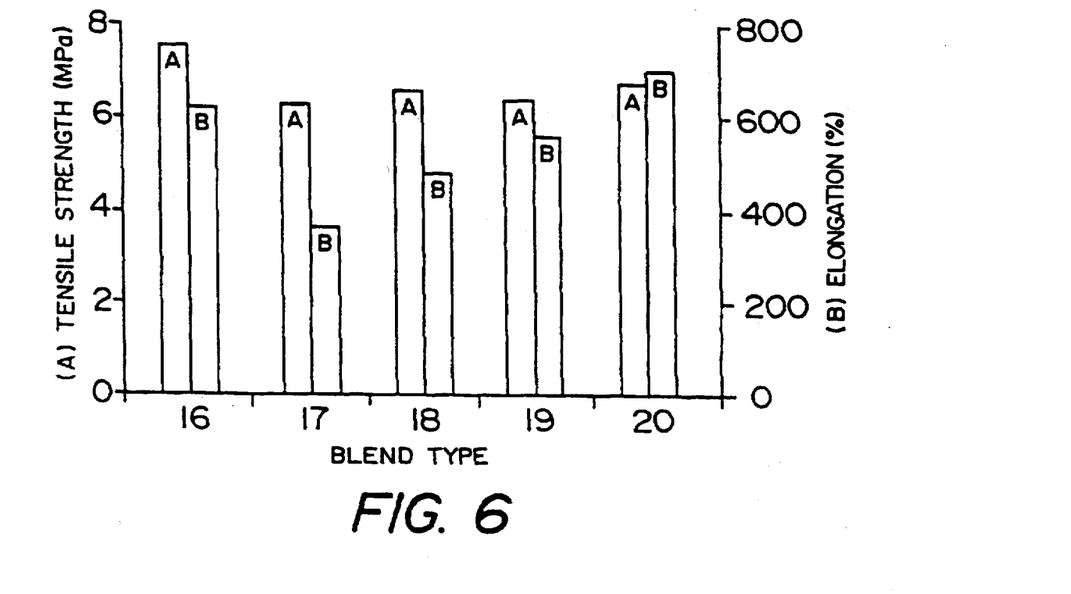

The equipment and procedure to make blown film using the blends is described in Example 12. The tensile strength and elongation at break test results for films made from blend 16 and 20 are listed in Table 10, and illustrated graphically in FIG. 6. In FIG. 6, bars A represent tensile strength and bars B represent elongation at break.

TABLE 10

| Specimens or Blend No. | Tensile Strength MD MPa | Elongation at Break % |
| --- | --- | --- |
| 16 | 7.53 | 620 |
| 17 | 6.28 | 360 |
| 18 | 6.61 | 480 |
| 19 | 6.39 | 560 |
| 20 | 6.72 | 700 |

SUMMARY

The material described hereinbefore, namely the blend of polyisoprene and polycaprolactone resins, possesses a unique combination of the following properties:

(1) thermoplastic properties that allow the material to be processed using conventional thermoplastic-working techniques; and (2) degradability properties that allow the material to completely degrade following the natural mechanisms of biodegradation and photodegradation.

Blends of the material can be successfully processed using techniques such as injection molding, blow molding, thermoforming, extrusion, compression molding, and transfer molding to produce articles commonly made with thermoplastic resins.

The addition of polycaprolactone to polyisoprene results in increased tensile modulus, and significantly reduced or eliminated elasticity in comparison to the original polyisoprene properties and imparts the ability for polymer orientation. Moreover, polycaprolactone alleviates the problem

*Based on total peroxide content of Trigonox 29/40 of polyisoprene sticking to cold metal molds during thermoplastic processing.

Blends of the material will biodegrade in soil or sea water and will photodegrade upon exposure to sunlight, and are expected to generate only carbon dioxide and water as products of degradation.

The composition of the blends includes 10 to 500 parts by weight (pbw) of polycaprolactone per 100 pbw polyisoprene, with the preferred range being 25 to 200 pbw polycaprolactone to 100 pbw polyisoprene. Additives commonly used in the plastic and rubber industry may be added to the blends in small amounts in order to enhance properties.

As demonstrated in Examples 13 and 14, in accordance with the present invention it has proven possible to make blown films with a polyisoprene/polycaprolactone ratio of 4:1 (20% polycaprolactone in total polymer content). The thorough mixing of the polyisoprene and the polycaprolactone before the introduction of the peroxide appears to be important. In addition to Trigonox 29/40, after organic peroxides which may be added to the blend include inter alia Trigonox 21 (t-butylperoxy-2-ethylhexanoate), Trigonox 41C50 (t-butyl peroxyisobutyrate) and Laurox* (dilauroyl peroxide).

* trademark

The prior art describes polyisoprene/polycaprolactone blends which possess thermoplastic properties (see Canadian Patents Nos. 1,080,875 and 1,111,179) but, because of the use of components such as sulphur vulcanized natural rubber or ionomer copolymer, the feature of degradability is not addressed. Manufacturing goods using conventional thermoplastic processes is not mentioned. In the one case where biodegradability is mentioned, (Japanese Patent 89293048), polyisoprene/polycaprolactone comprise a part of a formulation, for which thermoplastic properties, and photodegradable are not required or featured. Hence, the known prior art does not teach combined thermoplasticity and degradability properties.

The embodiments of the invention in which an exclusive property or privilege is claimed are defined as follows:

1. A photodegradable and biodegradable, thermoplastic polymer composition comprising a blend of 10 to 500 parts by weight polycaprolactone per 100 parts by weight polyisoprene, and 2–6 parts of stearic/palmitic fatty acid and 0.03–0.20 parts of an organic peroxide per 100 parts of total polycaprolactone and polyisoprene.

2. A composition according to claim 1, including 25 to 200 parts by weight polycaprolactone per 100 parts by weight polyisoprene.

3. A composition according to claim 1, wherein the polyisoprene is in the form of natural rubber.

4. A composition according to claim 1, wherein the flow properties of the composition above the softening point permit processing of the composition using conventional thermoplastic working methods.

5. A composition according to claim 1 which can be permanently oriented by the application of force.

6. A composition according to claim 1, including polyisoprene and polycaprolactone in a weight ratio of up to 4:1.

7. A composition according to claim 1, wherein said organic peroxide is 1,1-di-(t-butylperoxy)-3,3,5-trimethylcyclohexane.

8. A method for making a photodegradable and biodegradable, thermoplastic polymer composition comprising steps of:

(a) blending 10 to 500 parts by weight polycaprolactone with 100 parts weight polyisoprene at a temperature above 60° C.;

(b) adding to the polymer blend thus produced 2–6 parts of stearic/palmitic fatty acid and 0.03–0.20 parts of an organic peroxide per 100 parts of total polycaprolactone and polyisoprene; and (c) processing the resulting blend into a form suitable for further thermoplastic working.

9. A method according to claim 8, wherein 50 to 200 parts by weight polycaprolactone is blended with 100 parts by weight polyisoprene.

10. A method according to claim 8, wherein blending is performed at a temperature of 65° to 75° C.

11. A method according to claim 8, including the step of:

(d) adding a small amount of an additive common in the plastic and rubber industry to the composition.

12. A method according to claim 11, wherein said additive is selected from the group consisting of casein, antioxidants, dyes, fillers, vulcanized vegetable oils, coupling agents, fragrances, blowing agents, antistatic agents, fire retardants and pigments.

13. A method according to claim 8, including the step of molding the blend to form a biodegradable and photodegradable plastic article.

14. A method according to claim 13, wherein the blend is injection molded.

15. A method according to claim 13, wherein the blend is blow molded.

16. A method according to claim 13, wherein the blend is extruded.

17. A method according to claim 13, including the step of irradiating the article.

18. A method according to claim 13, wherein the blend contains polyisoprene and polycaprolactone in a weight ratio of up to 4:1, and the blend is used to produce a blown film.

19. A method according to claim 18, wherein the organic peroxide is 1,1,-di-(t-butylperoxy)-3,3,5-trimethylcyclohexane.

20. A method according to claim 19, including the step of irradiating the blown film.

* * * * *